United States Patent [19]
Anderson

[11] 4,317,362
[45] Mar. 2, 1982

[54] PIPELINE IDENTIFICATION

[75] Inventor: Leo J. Anderson, Lake Jackson, Tex.

[73] Assignee: The Dow Chemical Company, Midland, Mich.

[21] Appl. No.: 164,469

[22] Filed: Jun. 30, 1980

[51] Int. Cl.³ .......................................... G01M 19/00
[52] U.S. Cl. ...................................................... 73/37
[58] Field of Search ................................... 73/37, 49.5

[56] References Cited
U.S. PATENT DOCUMENTS
3,914,754 10/1975 Kirk ........................................ 73/37

Primary Examiner—Anthony V. Ciarlante
Attorney, Agent, or Firm—M. W. Barrow

[57] ABSTRACT

Identity of pipeline at a first location as being the same pipeline at a second location, at which the pipeline pressure can be varied, is achieved by attaching a strain gage to the pipeline at the first location, varying the pressure in the pipeline at the second location, and observing the strain gage to see if it varies correspondingly to the pressure changes.

2 Claims, 2 Drawing Figures

4,317,362

PIPELINE IDENTIFICATION

BACKGROUND OF THE INVENTION

This invention relates to a method of verifying the identity of a pipeline at one location as being the same as a pipeline at another location.

In pipeline work, identification of pipelines already in place for a period of time is increasingly becoming a more difficult problem despite the use of color codings, maps, etc. In large part, this increase in difficulty is due to the ever increasing number of lines being laid, more activity on the lines, and more emphasis being placed on environmental concerns. For example, when a worker digs down into a pipeline right of way for natural gas pipelines, he is often confronted with several pipelines. How is he to be sure which one of the several lines is the one which has been purged of explosive gas before he cuts into it with his cutting torch. This uncertainty of identification exists even of pipelines above ground where tracing would seem very easy. But, for example, where the location of work to be carried on a pipeline is miles distant from its source or is in a pipe rack containing several lines, such tracing becomes increasingly difficult. The uncertainty of having the wrong pipe is a very real factor to the worker, or it should be, for there have been many incidents wherein serious injuries and fatalities have occurred.

Several pipeline location devices have been tried but due to pipeline crossings and turnings and due to the presence of older and newer pipelines in the same vicinity, often known but also often unknown, these location devices have not proven as satisfactory as one would desire.

Hence it would be highly advantageous to have a method of positive pipeline identification. The present invention achieves this.

SUMMARY OF THE INVENTION

The present invention is a method for verifying that the identity of a pipeline at a first location is the same as the pipeline located at a second location. This method comprises three steps. First, a strain gage is attached to the pipeline at the first location. Secondly, pressure in the pipeline is varied by pressure varying means at the second location. Thirdly, the strain gage is observed to see if its output corresponds in time and magnitude to the pressure variations applied at the second location.

DETAILED DESCRIPTION OF THE INVENTION

Figure 1:
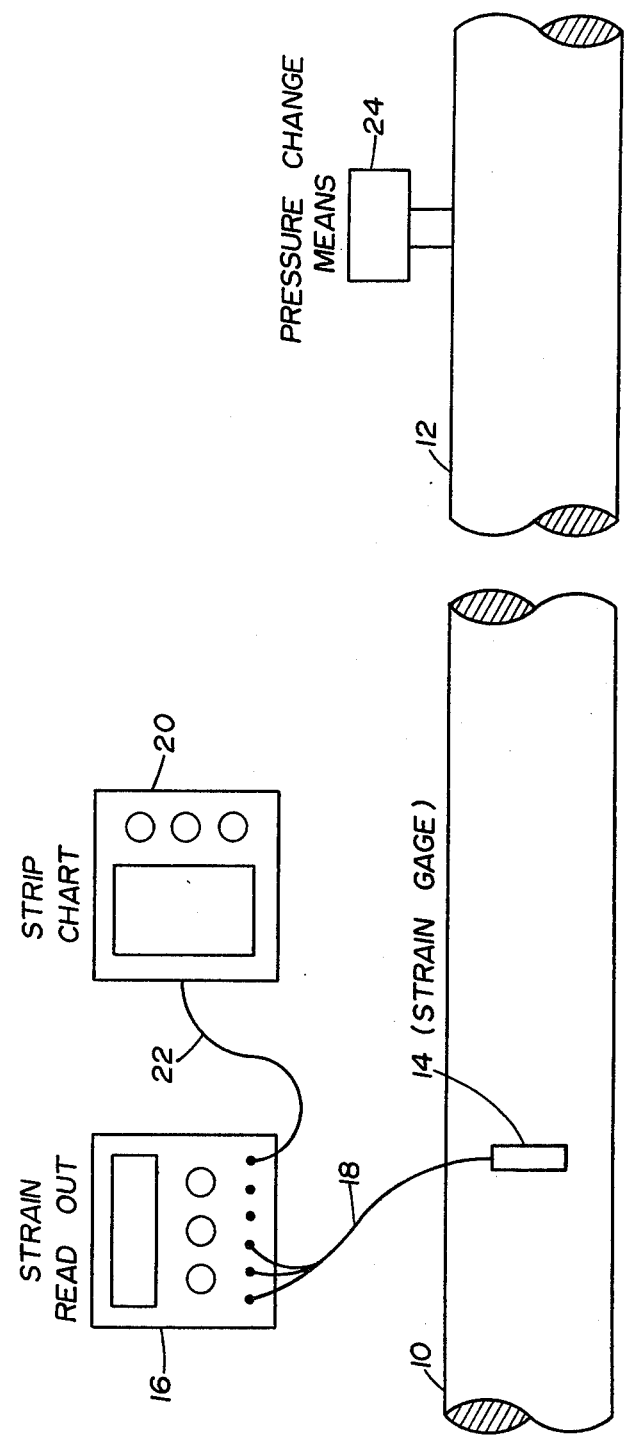
FIG. 1 is a schematic representation of the locations and equipment involved in the method of this invention.

A clearer understanding of this invention may be obtained by reference to FIG. 1 wherein a pipeline 10 at one location is desired to be positively identified as being the same as a pipeline 12 at another location. A place on pipeline 10 is prepared for receiving a strain gage. Strain gage 14 is affixed, preferably welded to save much time, to pipe 10 in a manner so as to measure any change in strain in said pipe 10. A portable strain read out meter 16 is electrically connected to strain gage 14 by wires 18. A portable strip chart recorder 20 is connected to strain read out meter 16 by wires 22.

The pressure in pipe 12 at the other location is then varied at a specified time in any one of the multitude of pressure change patterns by pressure changing means 24. Pressure changing means can be a valve, a pump or any other device suitable for changing pressure in a pipeline.

EXAMPLE I

A four-inch diameter, schedule 40 underground pipeline was located underground beneath and cutting across a drainage ditch at a site near the sewage disposal plant in the city of Clute, Texas. This pipeline needed to be cut into and worked on in order to bury it deeper as the drainage ditch was to be enlarged and deepened. In the area around this drainage ditch site, there were known to be several other pipelines. It was thought that the pipeline to be worked on was about a 14-mile pipeline carrying a flammable liquid between two separated facilities of The Dow Chemical Company. The drainage ditch pipeline site in Clute was about midway between the two Dow sites. At one end of the 14-mile pipeline connecting the two Dow sites was a compressor used for pumping the flammable liquid through that pipeline which was capable of changing the pressure in that pipeline.

Although the identity of the pipeline crossing the drainage ditch was thought to be the same as the pipeline connecting the two Dow facilities, it was desired to positively identify the pipeline crossing under the drainage ditch as being the same as the pipeline connecting the two Dow facilities.

To positively identify pipeline at the drainage ditch as being the same as the pipeline connecting the two Dow facilities, the following equipment and procedure were used.

Equipment

1. Portable strain indicator, Model P340A from Vishay Instruments of Raleigh, North Carolina.
2. Portable strip chart recorder, Model 4201 from Soltec Corporation of Sun Valley, California.
3. Portable strain gage welder system including weldable strain gages from Ailtech of City of Industry, California.
4. Portable hand grinder, Model 280 from Dremel, available from local hobby shops or hardware stores.
5. Portable 115 volt power generator, Model ER400, from Honda at local Honda distributor.

Procedure

1. Using the portable 115 volt generator as a power source, the hand grinder was used to clean a section of about 1 inch by 3 inches off the surface of the pipeline located at the drainage ditch site which pipeline had previously had the dirt removed from it.
2. The weldable strain gage was welded to the cleaned surface of the drainage ditch pipeline using the strain gage welder system and the portable 115 volt generator.
3. The strain gage was connected to the portable strain indicator which in turn was connected to the portable strip chart recorder at the drainage ditch pipeline site.
4. Via radio from the drainage ditch pipeline site, an operator at one of the Dow facilities was instructed to lower and then raise the pressure in the line connecting the two Dow facilities by 50 pounds per square inch using a compressor located at that facility. The 50 psi pressure changes were derived using the following criteria: a strain change of 20 microinches per inch would clearly show up on the drainage ditch pipeline strain gage and accompanying equipment and a pressure change of 50 psi was calculated to produce this 20 microinch/inch strain according to the following rule of thumb formula:

$$\text{Pressure Change for 20 microinch per inch strain} = \frac{\text{Pipe Wall Thickness} \times 1200}{\text{Pipe Diameter}}$$

5. The operator at the Dow location lowered the pressure of the pipeline connecting the two Dow facilities and a strain change of 16 microinches/inch was detected on the pipeline at the drainage ditch site.

The Dow operator then raised the pressure by 50 psi in the pipeline connecting the two Dow facilities and the strain gage equipment attached to the drainage ditch pipeline showed an increase of 16 microinches/inch.

This correspondence of strain change in the pipeline at the drainage ditch site to the 50 psi pressure changes in the pipeline connecting the two Dow facilities positively identified the two as being the same pipeline. Hence, when the pipeline connecting the two Dow facilities was subsequently emptied and purged from the Dow facility sites, the workmen at the drainage ditch pipeline site could be assured that they were going to cut into a pipeline with a cutting torch which was indeed purged instead of only thought to be purged.

The above set-forth procedure for positively identifying the drainage ditch pipeline took approximately 30 minutes. The use of a normal nonweldable strain gage would have required about two hours or more. Hence, weldable strain gages are greatly preferred.

EXAMPLE II

Figure 2:
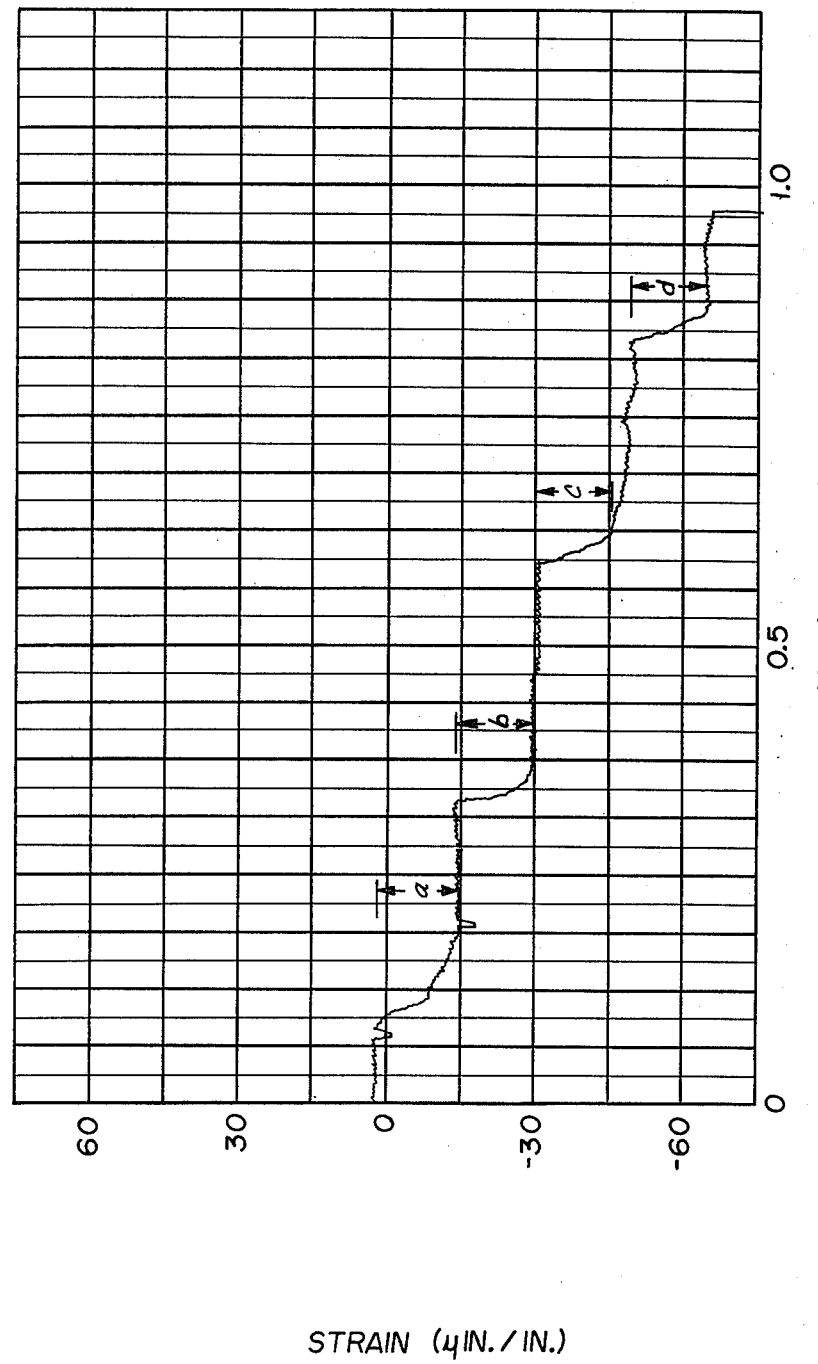
FIG. 2 is a reproduction of the strain gage strip recorder read-out for Example II.

A short piece (about 60 feet long) of 4-inch diameter, schedule 40 pipe was hydro-tested for strain gage changes induced by pressure changes in the water in the pipe. The same equipment and procedure as that used in Example I were used except that a valve was used to release the pressure in the pipe and was visually identifiable as being on the pipe, and the pipe was above ground. Pressure drops of 50 psi were induced in the pipe at four separate times. FIG. 2 is a reproduction of the strip chart strain recordings corresponding to these four pressure reductions. In FIG. 2, graph segments identified as a, b, c and d show that the four pressure reductions produced a corresponding negative strain reduction of approximately 15 microinch per inch.

Using this equipment and procedure, it was discovered that pressure changes as small as 50 pounds per square inch can give unmistakable corresponding changes on the strain gage recorder.

Having described the invention, accordingly what is claimed is:

1. A method for verifying the identity of a pipeline at a site where its identity is uncertain as being the same pipeline at a location where the pipeline identity is certain, wherein tracing of the pipeline by visual observation is difficult from the location of certain identity to the site of uncertain identity, said method comprising:
    a. affixing a strain gage to the pipeline at the site where its identity is uncertain;
    b. varying the pressure within the pipeline at its location of certain identity by selected variations; and
    c. observing the strain gage output at the location of uncertain pipeline identity to see if it produces variations in readings which correspond in time and magnitude to the variations of pressure applied to the pipeline at the location of certain identity.

2. The method of claim 1 wherein the pressure changes are at least 50 psi.

* * * * *